(12) United States Patent
Ueda et al.

(10) Patent No.: US 7,637,650 B2
(45) Date of Patent: Dec. 29, 2009

(54) CONTINUOUS MIXER AND OPERATING METHOD THEREOF

(75) Inventors: Hiroshi Ueda, Takasago (JP); Kazuyoshi Imuta, Takasago (JP); Masahiko Kashiwa, Takasago (JP); Shoji Yasuda, Takasago (JP); Shin Hotani, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 417 days.

(21) Appl. No.: 10/860,007

(22) Filed: Jun. 4, 2004

(65) Prior Publication Data

US 2004/0257903 A1    Dec. 23, 2004

(30) Foreign Application Priority Data

Jun. 17, 2003  (JP) .............................. 2003-172186

(51) Int. Cl.
    *B29B 7/38*    (2006.01)
(52) U.S. Cl. .............................. 366/77; 366/84; 198/675
(58) Field of Classification Search ................ 425/204, 425/207, 208; 241/82.1; 198/675; 366/75, 366/77, 64, 79, 84, 85, 297, 301, 318
    See application file for complete search history.

(56) References Cited

U.S. PATENT DOCUMENTS

| 626,108 | A | * | 5/1899 | Stuckel | 198/675 |
| 720,249 | A | * | 2/1903 | Harrison | 198/675 |
| 806,643 | A | * | 12/1905 | Chatfield | 198/675 |
| 2,693,348 | A | * | 11/1954 | Ellermann | 366/85 |
| 4,681,457 | A | | 7/1987 | Orimo et al. | |
| 5,143,448 | A | | 9/1992 | Ueda et al. | |
| 5,590,959 | A | | 1/1997 | Ueda et al. | |
| 5,672,005 | A | | 9/1997 | Fukui et al. | |
| 5,866,201 | A | | 2/1999 | Blue | |
| 5,947,593 | A | | 9/1999 | Inoue et al. | |
| 6,280,074 | B1 | | 8/2001 | Kuroda et al. | |

(Continued)

FOREIGN PATENT DOCUMENTS

JP           62-14931           1/1987

(Continued)

OTHER PUBLICATIONS

Patent Abstracts of Japan, JP 59-216617, Dec. 6, 1984.

*Primary Examiner*—David L Sorkin
(74) *Attorney, Agent, or Firm*—Oblon, Spivak, McClelland, Maier & Neustadt, L.L.P.

(57) ABSTRACT

In a continuous mixer, a chamber formed in a barrel comprising a feed port for feeding raw material to be mixed on one end side and a discharge port for discharging mixed material on the other end side. A pair of screw provided in the chamber has a feed part for conveying raw material to be mixed which is fed through the feed port and a mixing part for mixing the raw material. The barrel is provided with a raw material discharge port for communicating the position corresponding to the feed part in the chamber to the outside of the barrel, and an opening/closing cover for freely opening and closing the raw material discharge port. The screw can be rotated reversibly. Even though large amounts of raw materials to be mixed may stay in the chamber due to an emergency stop, the raw materials can be easily discharged from the raw material discharge port.

1 Claim, 4 Drawing Sheets

U.S. PATENT DOCUMENTS 6,409,373 B1 6/2002 Tanaka et al.
6,682,213 B2 1/2004 Inoue et al.

FOREIGN PATENT DOCUMENTS

| JP | 62-33621 | 2/1987 |
| JP | 4-158020 | 6/1992 |
| JP | 9-29207 | 2/1997 |
| JP | 2001-9830 | 1/2001 |

* cited by examiner

CONTINUOUS MIXER AND OPERATING METHOD THEREOF

BACKGROUND OF THE INVENTION

1. Field of the Invention

The present invention relates to an improvement of continuous mixer and operating method thereof, and more precisely, a continuous mixer and operating method thereof to enable a main motor to easily re-operate the continuous mixer after an emergency stop by discharging a raw material to be mixed in a barrel prior to the re-operation.

2. Description of the Related Art

One constitution is known as will hereinafter be described for example as a continuous mixer for mixing a raw material such as powdery, pellet-like or granular resin etc. which is fed into a feed zone from a feeder through a hopper and a feed port. The present invention will be more fully understood from the following description of a twin continuous mixer as an example of continuous mixer when reference is made to FIG. 6, a side cross-sectional view showing the overall structure of the twin continuous mixer.

The numeral 51 shown in FIG. 6 indicates a twin continuous mixer, which comprises a barrel 52, wherein an approximately cylindrical twin chamber 53 in the longitudinal direction is formed to be communicated through an approximately spectacle-shaped cross-section. In the chamber 53, a pair of left and right rotors 54 (hereinafter referred to as screw) for feeding a raw material to be mixed from one end side (upstream side, that is, right-hand side of FIG. 6) of the barrel 52 to the other end side (downstream side, that is, left-hand side of FIG. 6), and for mixing and melting in the mid-flow thereof, are penetrated in parallel to each other freely rotatably. Bearings 55, 56 and 57 are provided on the upstream and downstream side of the barrel 52. Each of the screws 54, the end parts in the axial direction of which being supported freely rotatably by the bearings 55, 56 and 57, is constituted to be rotatably driven in different directions with each other so that the inner side opposing to the pair moves from above to below.

A driving unit 58 is connected at the upstream side end of the barrel 52 for the screws 54. The driving unit 58 comprises a casing 59 connected tandemly to the upstream side end of the barrel 52, a pair of front and rear bearings 55 and 56 for supporting freely rotatably a driving axis member 60 of the par of screws 54, 54 penetrated in the casing 59, and a driving gear 61 fixed in the longitudinal middle of the driving axis member 60. The driving axis member 60 of one of the screws 54, 54 protrudes outward to the further upstream side of the casing 59. The end of the protruding driving axis member is connected to a motor 62 with reduction gear. The driving gears 61 for each screw 54, 54, which are engaged each other, are constituted so that in the case one of the screws 54 is rotatably driven by the motor 62, the other is rotated in another direction.

On the upper surface side of the upstream side end of the barrel 52 is provided a feed port 63, for feeding raw material to be mixed into the mixing chamber 53. A hopper not shown is connected to the feed port 63. In the intermediate part of the barrel 52 is formed a vent hole 64 for degassing the gas both entrained when feeding raw material and generated during mixing, from the chamber 53. On the lower surface side of the downstream side end of the barrel 52 is also provided a discharge port 65 downward for discharging melted mixed material outside the barrel 52. Further, in the middle of the raw material conveying direction of the barrel 52 is provided a gate device 67 for adjusting the flow rate of the raw material by bringing/pulling a pair of above and below gate plates 66 close to/away from the outer circumference of the screw 54 outward radially. Therefore the chamber 53 in the barrel 52 is partitioned into two mixing zone 53a and 53b, each of which being arranged tandemly respectively on the upstream and downstream side of the gate device 67.

On the outer circumference of the screw 54 penetrated in the first mixing zone 53a of the two mixing zone above, which is arranged on the upstream side of the gate device 67, is formed in order from the upstream side a first feed part 68 for feeding forward the raw material to be mixed fed through the feed port 63, and a first mixing part 69 for mixing and melting the raw material by adding a strong shearing force thereto. Meanwhile, on the outer circumference of the screw 54 penetrated in the second mixing zone 53b, which is arranged on the downstream side of the gate device 67, is formed a second feed part 70 for conveying the mixed material melted in the first mixing part 69 forcibly toward the discharge port 65 (refer to Japanese Patent Laid-Open Publication No. 2001-9830 for example).

In accordance with a continuous mixer related to the above-described prior art, a raw material to be mixed comprising either powdery, pellet-like or granular resin, which is fed from the feeder, is fed into the first feed part through the feed port. The raw material to be mixed, which is fed into the first feed part, is conveyed to the first mixing part in the first mixing zone on by a screw being normally rotated, wherein to be mixed and melted, and also to a second mixing zone on the downstream side of the gate device. The material being mixed and melted, which is fed into the second mixing zone, is forcibly conveyed toward the discharge port by the second feed part of the screw, and then discharged outside the mixer through the discharge port.

The screw of the continuous mixer is constituted to be rotatably driven by a main motor with reduction gear as described above. The main motor starts with a low starting torque after discharging a residual material in the barrel through the discharge port before starting the operation of the continuous mixer. Therefore, there is provided a burring motor of small capacity other than the main motor for rotating the screw at low speed to discharge the residual material before starting the operation.

In the case of the continuous mixer being emergently stopped due to some kind of reason, there may arise a situation, depending on the stop timing of the feeder on the upstream side, that large amounts of residual materials containing a raw material to be mixed and/or a mixed material stay in the chamber in the barrel.

In spite of the effort to discharge such large amounts of residual materials in the chamber by rotating the screw using the burring motor, since another residual material consisting of raw material to be mixed before melting, which is left in the first feed part, may be pressed, it is impossible to discharge a residual material in the chamber completely through the discharge port, resulting in that the restarting of the continuous mixer may become difficult.

To start the operation of the continuous mixer by starting the main motor with a low starting torque is based on the following reason. That is, a motor that can provide a 100% torque from the rising is expensive and also the frame number becomes higher due to the design thereof own. In general, main motor of as much as several thousand KW is usually designed with the starting torque being restricted, wherein a current limit may be made when starting depending on the power facility of the plant. For instance, in the case of a main motor which provides a 40% starting torque, a burring motor (of an approximately 60% capacity) is used to check before driving if the main motor can be driven with a torque of 40% or less.

SUMMARY OF THE INVENTION

Accordingly, it is an object of the present invention to provide a continuous mixer and operating method thereof, even though large amounts of raw materials to be mixed may stay in a chamber in a barrel due to an emergency stop, to enable the raw material to be mixed easily discharged.

The present invention is made in view of the foregoing circumstances. A continuous mixer according to the present invention comprises: a barrel in which a chamber for mixing raw material to be mixed is formed; a feed port for feeding the raw material to be mixed provided on one end side of the barrel; a discharge port for discharging mixed material provided on the other end side of the feed port of the barrel; a screw which is penetrated in the chamber and comprises a feed part for conveying the raw material to be mixed fed through the feed port and a mixing part for mixing the raw material to be mixed; a driving unit which rotates the screw for mixing the raw material to be mixed; a raw material discharge port for communicating the position corresponding to the feed part in the chamber to the outside of the barrel; and opening/closing means for freely opening and closing the raw material discharge port.

The continuous mixer of the construction above can further comprise an opening/closing driving means, which drives the opening/closing means so as to open and close the raw material discharge port.

In the continuous mixer of the construction above, the driving unit is preferably capable of rotating said screw reversibly.

In an operating method of a continuous mixer according to the present invention, the continuous mixer comprises: a barrel in which a chamber for mixing raw material to be mixed is formed; a feed port for feeding the raw material to be mixed provided on one end side of the barrel; a discharge port for discharging mixed material provided on the other end side of the feed port of the barrel; a screw which is penetrated in the chamber and comprises a feed part for conveying the raw material to be mixed fed through the feed port and a mixing part for mixing the raw material to be mixed; a driving unit which rotates the screw for mixing the raw material to be mixed; and a raw material discharge port for communicating the position corresponding to the feed part in the chamber to the outside of the barrel, wherein the raw material to be mixed in the chamber is discharged through the raw material discharge port by at least rotating the screw reversibly, prior to the re-operation after an emergency stop of the continuous mixer in operation.

In accordance with the mixer or the operating method of the mixer of the present invention, residual material consisting of raw material to be mixed before melting, which is left in the chamber in the barrel, may be discharged through the raw material discharge port. For the reason, there is no such situation that the residual material consisting of raw material to be mixed before melting may be pressed, which may arises in the mixer related to the prior art, wherein all of residual material in the chamber need to be discharged through the discharge port on the downstream side. Accordingly, the present invention achieves a superior effect capable of starting re-operation of the mixer easily.

DESCRIPTION OF THE PREFERRED EMBODIMENTS

Figure 1:
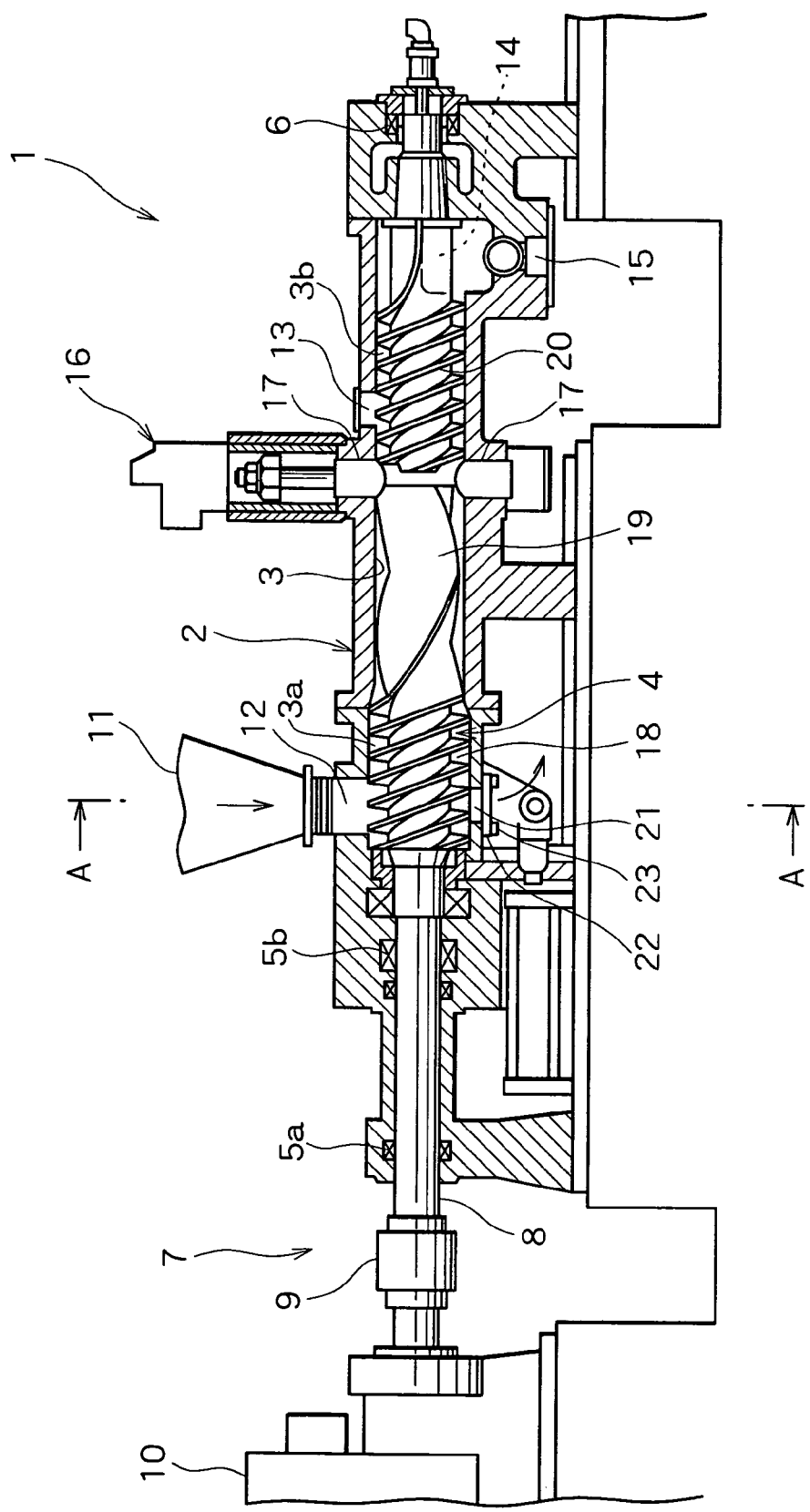
FIG. 1 is a side cross-sectional view showing the overall structure of the mixer related to the embodiment 1 of the present invention.
Figure 2:
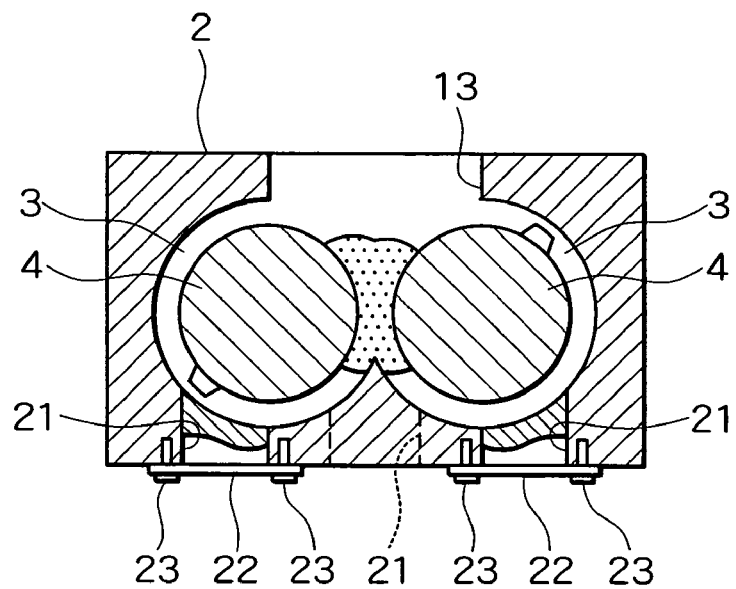
FIG. 2 is a cross-sectional view taken in the line A-A of FIG. 1.
Figure 3:
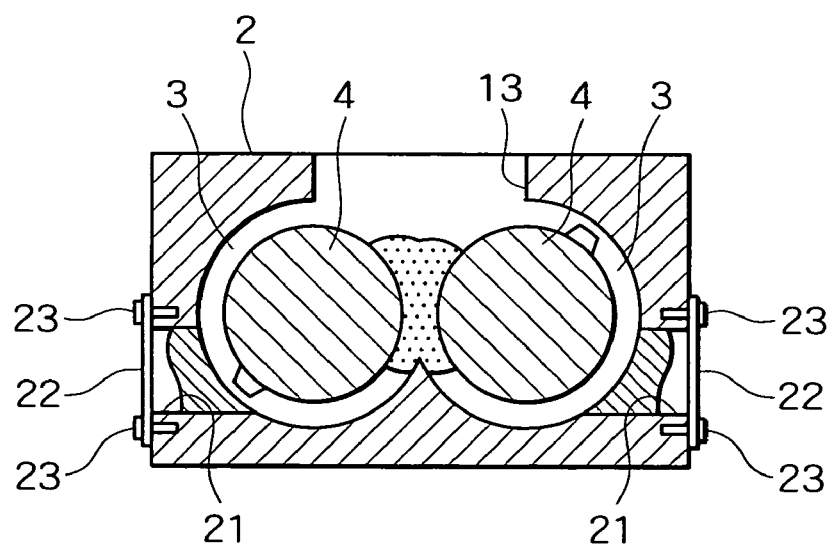
FIG. 3 is a cross-sectional view related to another example of the embodiment 1 of the present invention, corresponding to the cross-sectional view taken in the line A-A of FIG. 1.

A continuous mixer, which being a twin continuous mixer for example, related to embodiment 1 of the present invention will be described as follows when reference is made to the accompanying drawings. FIG. 1 is a side cross-sectional view showing the overall structure of a twin continuous mixer. FIG. 2 is a cross-sectional view taken in the line A-A of FIG. 1. FIG. 3 is a cross-sectional view related to another example, corresponding to the cross-sectional view taken in the line A-A of FIG. 1.

The numeral 1 shown in FIG. 1 indicates a twin continuous mixer (hereinafter referred to as mixer) related to the present embodiment 1. The mixer 1 comprises a barrel 2. In the barrel, a combination of two approximately cylindrical spaces in the longitudinal direction is provided to form a chamber 3. The chamber 3 has an approximately spectacle-shaped cross-section and the two approximately cylindrical spaces are communicated with each other. In the chamber 3, a pair of left and right screw 4 (only one of which is shown in FIG. 1) for feeding a raw material to be mixed such as powdery, pellet-like or granular resin etc. from one end side (upstream side, that is, left-hand side of FIG. 1) of the barrel 2 to the other end side (downstream side, that is, right-hand side of FIG. 1), and for mixing and melting in the mid-flow thereof, are penetrated in parallel to each other freely rotatably. Bearings 5a, 5b and 6 are provided on the upstream and downstream side of the barrel 2. Each of the screws 4, the end parts in the axial direction of which being supported freely rotatably by the bearings 5a, 5b and 6, is constituted to be rotatably driven in different directions with each other so that the inner side opposing to the pair moves from above to below.

At the upstream side end of the barrel 2 above is connected a driving unit 7 for rotatably driving the screws 4. The driving unit 7 comprises a pair of above-described bearings 5a and 5b for supporting freely rotatably a driving axis member 8 of the screws 4, 4, and a driving gear 9 fixed in the longitudinal direction of the driving axis member 8 and on the front side of the bearings 5a and 5b. A protruding end from the driving gear 9 for the driving axis member 8 of one of the screws 4, 4 is connected to a main motor 10 with reduction gear. The driving gears 9 for each screw 4, 4, which are engaged each other, are constituted so that in the case one of the screws 4 is rotatably driven by the main motor 10, the other is rotated in another direction. Additionally, a burring motor of small capacity having a reversible rotation function, though not shown in FIG. 1, is provided in the mixer 1. The screw 4 is constituted to be reversibly rotated by the burring motor.

On the upper surface side of the upstream side end of the barrel 2 is provided a feed port 12, for feeding raw material to be mixed into the chamber 3. A hopper 11 is connected to the upper opening of the feed port 12. In the intermediate part of the barrel 2 is formed a vent hole 13 for degassing the gas both entrained when feeding raw material to be mixed and generated during mixing from the chamber 3. On the lower surface side of the downstream side end of the barrel 2, a discharge port 14 sideward for discharging melted mixed material outside the barrel 2 and residual material discharge port 15 downward for discharging residual material are provided. Further, in the middle of the raw material conveying direction of the barrel 2 is provided a gate device 16 for adjusting the flow rate of the raw material to be mixed by bringing/pulling a pair of above and below gate plates 17 close to/away from the outer circumference of the screw 4 outward radially. Therefore, the chamber 3 in the barrel 2 is partitioned into a feeding/mixing zone 3a on the upstream side of the gate device 16 and a degassing/discharging zone 3b on the downstream side thereof.

On the outer circumference of the screw 4 penetrated in the feeding/mixing zone 3a on the upstream side of the gate device 16, a first feed part 18 for feeding forward the raw material to be mixed fed through the feed port 12, and a mixing part 19 for mixing and melting the raw material by adding a strong shearing force thereto are formed in order from the upstream side. Meanwhile, on the outer circumference of the screw 4 penetrated in the degassing/discharging zone 3b on the downstream side of the gate device 16, a second feed part 20 for conveying the mixed material melted in the mixing part 19 forcibly toward the discharge port is formed.

As will be well understood from the foregoing description, the mixer 1 follows approximately the same constitution as the mixer of the above-described prior art example. In the case of the mixer 1 of the present embodiment 1, raw material discharge ports 21, 21 opened downward are provided in the barrel 2, as shown in FIG. 2. The raw material discharge ports 21, 21 are communicated to the first feed part 18 of raw material to be mixed facing the feed port 12, Then, both openings of the raw material discharge ports 21 are closed by an opening/closing cover 22, as opening/closing means. The opening/closing cover 22 consists of an insert part to be inserted into the raw material discharge ports 21 and a flange part. The extreme end surface of the opening/closing cover 22 has an arc-like curved face forming a part of the inner wall of the chamber 3. The flange part is constituted by attaching/detaching detachable bolts 23 so that the raw material discharge ports 21 is freely opened/closed.

In the mixer 1 related to the present embodiment 1, the raw material discharge ports 21 are provided downward to each (two places in total) bottom of the spectacle-shaped of the chamber 3 as described above. However, the raw material discharge ports 21, without restriction to the foregoing constitution, may be constituted to open in the left and right direction of the barrel 2 as shown in FIG. 3 for example. The raw material discharge ports 21 may also be provided obliquely downward. Further, a raw material discharge port may be provided downward between the two raw material discharge ports 21 (in the center of the chamber) of the mixer 1 related to the present embodiment 1 instead of the two raw material discharge ports 21, as shown by the dashed line in FIG. 2.

From the following description of an action of the mixer 1 related to the foregoing embodiment 1, the openings of the raw material discharge ports 21, 21 are closed by the opening/closing cover 22 in a normal operation.

In such a state, the mixer 1 and also a feeder not shown are driven by the start of the main motor 10. Then, a raw material to be mixed comprising either powdery, pellet-like or granular resin, which is fed from the feeder, is fed into the hopper 11, and then fed into the first feed part 18 through the feed port 12. The raw material to be mixed, which is fed into the first feed part 18, is conveyed to the mixing part 19 in the feeding/mixing zone 3a on the downstream side by the screw 4 being normally rotated, wherein to be mixed and melted. Then the mixed and melted material is conveyed to the degassing/discharging zone 3b on the downstream side of the gate device 16. The mixed and melted material, which is fed into the degassing/discharging zone 3b, is forcibly conveyed toward the discharge port 14 by the second feed part 20 as being degassed through the vent hole 13 if necessary, and then discharged outside the mixer through the discharge port 14.

In the case of the mixer 1 being emergently stopped due to some kind of trouble occurred, the opening/closing cover 22 is removed from the raw material discharge ports 21 by unbolting the bolts 23 when re-operating the stopped mixer 1. Then, a residual material in the chamber 3 of the barrel 2 is discharged outside the mixer when the screw 4 rotates reversibly by the burring motor of small capacity. More precisely, a residual material consisting of raw material to be mixed before melting, which is left in the first feed part 18, is solved and discharged through the raw material discharge ports 21 by at least reversibly rotating the screw 4. Meanwhile, a residual material consisting of melted and mixed material is discharged through the residual material discharge port 15, which is provided a little on the upstream side of the discharge port 14 by normally rotating the screw 4.

In accordance with the mixer 1 related to the present embodiment 1, that is, the residual material consisting of raw material to be mixed before melting, which is left in the first feed part 18, is solved and discharged through the raw material discharge ports 21 as described above. Therefore, there is no such situation that the residual material consisting of raw material to be mixed before melting, which is left in the first feed part 18, may be pressed, which may arises in the mixer related to the prior art, wherein all of residual material in the chamber need to be discharged through the discharge port on the downstream side. In addition, the residual material consisting of melted and mixed material can be discharged through the residual material discharge port 15.

Accordingly, for the reason that the residual material left in the whole part of the chamber 3 can be easily discharged outside the mixer, there is achieved an effect capable of starting re-operation of the mixer 1 easily by the main motor 10. According to the present embodiment, the residual material consisting of mixed material is discharged through the residual material discharge port 15 provided a little on the upstream side of the discharge port 14. However, means for discharging the residual material is not limited to the embodiment in the present invention. Residual material consisting of mixed material may be discharged through a diverter valve, which is provided a little on the downstream side of the discharge port 14 for discharging mixed material. Also, raw material to be mixed may be discharged through the raw material discharge port 21 without reversibly rotating the screw if the opening area thereof can be made large.

Figure 4:
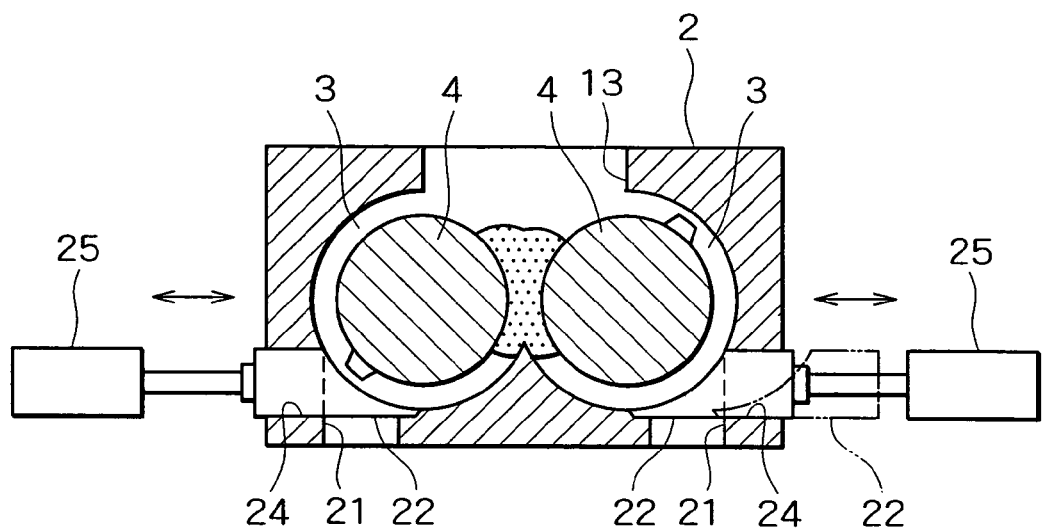
FIG. 4 is a transverse cross-sectional view of the first feed part of the mixer related to the embodiment 2 of the present invention.

A mixer related to embodiment 2 of the present invention will be described when reference is made to FIG. 4, a transverse cross-sectional view of the first feed part of the mixer. Differences between the mixer related to the present embodiment 2 and the mixer related to the foregoing embodiment 1, which are only in the opening/closing means of the raw material discharge port and opening/closing method thereof. Since the two mixers share the same basic constitution and action, they are described by assigning identical numeral to the same.

Cover fitting holes 24, 24 perpendicular to the raw material discharge port 21 opened downward are provided on the left and right side of the barrel 2. The opening/closing cover 22 which may be pushed or pulled to close or open the raw material discharge port 21 is fitted slidably to each of the cover fitting holes 24, 24. The extreme end surface of the opening/closing cover 22 has an arc-like curved face forming a part of the inner wall of the chamber 3. At the protruding end from the barrel 2 of the opening/closing cover 22 is connected the extreme end of an expansion rod of a hydraulic cylinder 25, as opening/closing driving means. The hydraulic cylinder 25 operates by feed and discharge of a pressure oil from a hydraulic piping not shown. A solenoid valve for switching the direction of pressure oil flow by operating a changeover switch is interposed to the hydraulic piping. That is, the hydraulic piping is constituted so that the opening/closing cover 22 is pushed and pulled by expansion and shrinkage operation of the expansion rod of the hydraulic cylinder 25 by switching the solenoid valve, and that the raw material discharge port 21 is opened and closed.

In the mixer related to the present embodiment 2, the hydraulic cylinder 25 is adopted as an opening/closing driving means for opening/closing the opening/closing cover 22. However, an air cylinder, an electric motor, a opening/closing driving means comprising hydraulic motor and ball screw (or square screw), or an opening/closing driving means comprising electric motor and ball screw (or square screw), for example, may be adopted instead of the hydraulic cylinder 25. The opening/closing driving means, therefore, is not limited to hydraulic cylinder.

In accordance with the mixer related to the present embodiment 2, the opening/closing cover 22 is pushed and pulled by expansion and shrinkage operation of the expansion rod of the hydraulic cylinder 25 by operating the change over switch, and the raw material discharge port 21 is opened and closed. For the reason that a residual material consisting of raw material to be mixed before melting, which is left in the first feed part, can be discharged by reversibly rotating the screw 4 through the raw material discharge ports 21, while a residual material consisting of melted and mixed material from the residual material discharge port, the mixer related to the present embodiment 2 achieves an effect equivalent to the mixer related to the foregoing embodiment 1. The present embodiment 2, wherein the opening/closing cover 22 is opened and closed by the hydraulic cylinder 25, is superior to the foregoing embodiment 1 in that the necessary time to start re-operation after an emergency stop is made shorter compared to the embodiment 1, wherein the opening/closing cover is opened/closed by attaching/detaching the bolts. According to the present embodiment 2, the raw material discharge port 21 is provided at two places of the chamber 3 as described for example. However, the number and the place of the raw material discharge port 21 are not limited to the embodiment in the present invention. The mixer may be constituted so that one raw material discharge port is provided downward in the center of the chamber 3, and that the opening/closing cover is opened/closed by a means of the same constitution as the present embodiment 2, A mixer related to embodiment 3 of the present invention will be described when reference is made to FIG. 5, a transverse cross-sectional view of the first feed part of the mixer. Differences between the mixer related to the present embodiment 3 and the mixer related to the foregoing embodiment 1, which are only in the opening/closing means of the raw material discharge port and opening/closing method thereof. Since the two mixers sharing the same basic constitution and action, they are described by assigning identical numeral to the same.

That is, the raw material discharge ports 21, 21 opened sideward are provided on the left and right side of the barrel 2. The opening/closing cover 22 which may be pushed or pulled to close or open the raw material discharge port 21 is fitted slidably to each of the raw material discharge ports 21, 21. The extreme end surface of the opening/closing cover 22 has an arc-like curved face forming a part of the inner wall of the chamber 3, At the outer end surface of the opening/closing cover 22 is connected the extreme end of a expansion rod of a hydraulic cylinder 25, as opening/closing driving means, which operates by feed and discharge of a pressure oil from a hydraulic piping not shown.

A solenoid valve for switching the direction of pressure oil flow by operating a changeover switch is interposed to the hydraulic piping as is the case with the hydraulic piping in the foregoing embodiment 2.

That is, the hydraulic piping is constituted so that the opening/closing cover 22 is pushed and pulled by expansion and shrinkage operation of the expansion rod of the hydraulic cylinder 25 by switching the solenoid valve, and that the raw material discharge port 21 is opened and closed.

It will be appreciated that in the present embodiment 3, an air cylinder, an electric motor, a opening/closing means comprising hydraulic motor and ball screw (or square screw), or an opening/closing driving means comprising electric motor and ball screw (or square screw) may be adopted instead of the hydraulic cylinder 25, as is the case with the foregoing embodiment 2.

Figure 5:
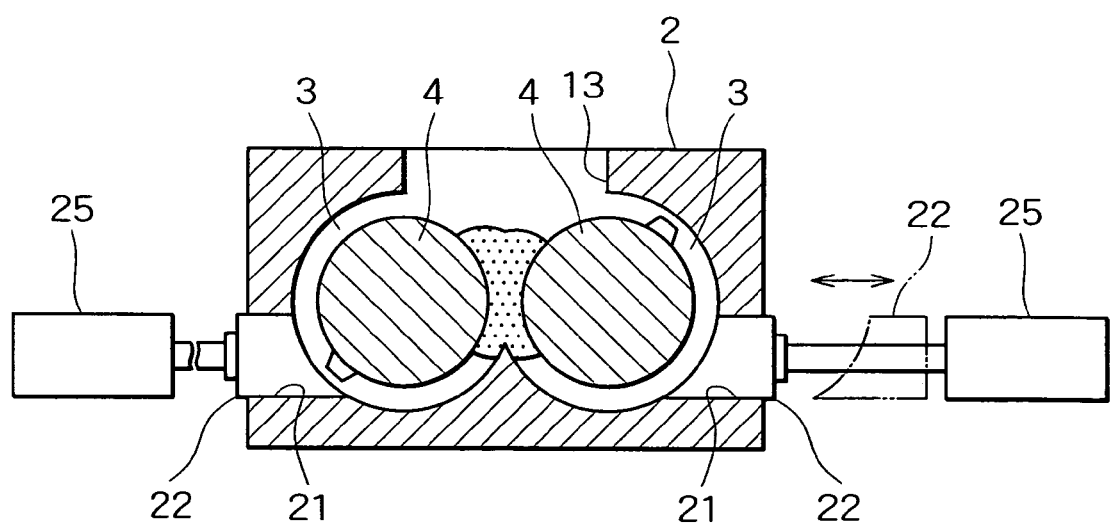
FIG. 5 is a transverse cross-sectional view of the first feed part of the mixer related to the embodiment 3 of the present invention.
Figure 6:
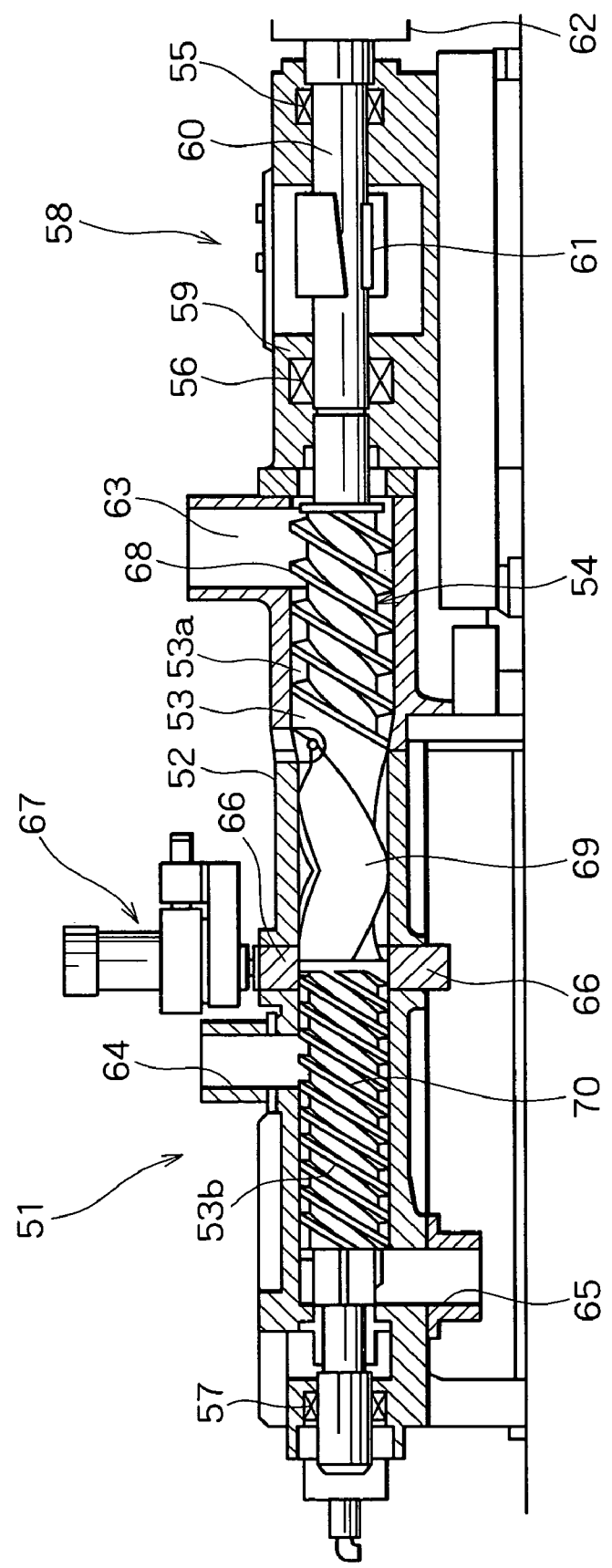
FIG. 6 is a side cross-sectional view showing the overall structure of the mixer related to the prior art.

In accordance with the mixer related to the present embodiment 3, the opening/closing cover 22 is pulled out from and pushed in the raw material discharge port 21, as shown by the solid and chain line in FIG. 5, by expansion and shrinkage operation of the expansion rod of the hydraulic cylinder 25 by operating the change over switch, and the raw material discharge port 21 is opened and closed.

Accordingly, for the reason that, by reversibly rotating the screw 4, a residual material consisting of raw material to be mixed before melting, which is left in the first feed part, can be discharged through the raw material discharge ports 21, while a residual material consisting of melted and mixed material through the residual material discharge port, the mixer related to the present embodiment 3 achieves an effect equivalent to the mixer related to the foregoing embodiment 1 or 2.

In all of the foregoing embodiment 1 to 3 is described a continuous mixer, which being a twin continuous mixer comprising both-ends-supported screws, rotated in different direction each other, for example. However, the technical idea related to the present invention may be applied to another twin continuous mixer comprising both-ends-supported screws, rotated in the same direction as each other. In addition, the technical idea related to the present invention may also be applied to a twin-screw extruder as another example of continuous mixer, wherein screws are supported in a cantilevered manner at a driving unit side.

What is claimed is:

1. An operating method of a continuous mixer comprising a barrel having a chamber; a feed port provided on one end side of said barrel; a mixed material discharge port provided on the other end side of said feed port of said barrel; a screw penetrated in said chamber, said screw comprising a feed part for conveying a resin raw material to be mixed and a mixing part for mixing the resin raw material to be mixed by applying a shearing force thereto; a driving unit; and a resin raw material discharge port positioned for communicating said feed part in said chamber to the outside of said barrel, the method comprising the steps of:

feeding resin raw material through the feed port;

rotating the screw via the driving unit in a first direction for conveying the resin raw material to the mixing part;

mixing and melting the resin raw material by applying a shearing force thereto via the mixing part while rotating the screw via the driving unit in the first direction; and rotating the screw via the driving unit in a second direction opposite the first direction for discharging said resin raw material through said raw material discharge port.

* * * * *